(12) United States Patent
Stancil et al.

(10) Patent No.: US 12,067,164 B2
(45) Date of Patent: Aug. 20, 2024

(54) HAPTIC FEEDBACK FOR COMPUTING SYSTEMS

(71) Applicant: Hewlett-Packard Development Company, L.P., Spring, TX (US)

(72) Inventors: Charles J. Stancil, Spring, TX (US); Tai Hsiang Chen, Taipei (TW); Hung-Ming Chen, Taipei (TW); Simon Wong, Spring, TX (US); Hsiang-Ta Ke, Taipei (TW); Yi-Hsien Lin, Taipei (TW); Jung-Hsing Wang, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/615,219

(22) PCT Filed: Sep. 16, 2019

(86) PCT No.: PCT/US2019/051359
§ 371 (c)(1),
(2) Date: Nov. 30, 2021

(87) PCT Pub. No.: WO2021/054936
PCT Pub. Date: Mar. 25, 2021

(65) Prior Publication Data
US 2022/0229494 A1 Jul. 21, 2022

(51) Int. Cl.
*G06F 3/01* (2006.01)
*G06F 3/0354* (2013.01)
*G06F 3/038* (2013.01)
*G06F 3/041* (2006.01)

(52) U.S. Cl.
CPC .......... *G06F 3/016* (2013.01); *G06F 3/03545* (2013.01); *G06F 3/0383* (2013.01); *G06F 3/0412* (2013.01); *G06F 2203/04105* (2013.01)

(58) Field of Classification Search
None
See application file for complete search history.

(56) References Cited

U.S. PATENT DOCUMENTS

| | | | |
|---|---|---|---|
| 9,063,588 B2 | 6/2015 | Buelow et al. | |
| 9,201,520 B2 | 12/2015 | Benko et al. | |
| 9,244,545 B2 | 1/2016 | Hinckley et al. | |
| 9,389,701 B2 | 7/2016 | Bakken et al. | |
| 9,727,161 B2 | 8/2017 | Hinckley et al. | |
| 9,977,520 B2 | 5/2018 | Hou et al. | |
| 10,564,724 B1* | 2/2020 | Bergeron | G06F 3/0383 |
| 2009/0236153 A1* | 9/2009 | Kyung | G06F 3/03545 |
| | | | 116/214 |
| 2013/0009907 A1 | 1/2013 | Rosenberg et al. | |
| 2014/0078117 A1* | 3/2014 | Asano | G09B 11/00 |
| | | | 345/179 |

(Continued)

FOREIGN PATENT DOCUMENTS

KR 20170060393 A 6/2017

*Primary Examiner* — Xuyang Xia
(74) *Attorney, Agent, or Firm* — Quarles & Brady LLP

(57) ABSTRACT

Techniques for proving haptic feedback in computing systems are described. In operation, an input representing utilisation parameters of an electronic pen is received. In an example, the electronic pen may be electronically coupled to the computing system. Based on the received utilisation parameters, the computing system provides a pattern of haptic feedback to the user.

17 Claims, 6 Drawing Sheets

(56) References Cited

U.S. PATENT DOCUMENTS

| | | | |
|---|---|---|---|
| 2014/0176472 A1* | 6/2014 | Lin | G06F 3/041 345/173 |
| 2014/0267184 A1* | 9/2014 | Bathiche | G06F 1/3259 345/179 |
| 2014/0285453 A1* | 9/2014 | Park | G06F 3/04883 345/173 |
| 2015/0116236 A1* | 4/2015 | Kim | G06F 3/038 345/173 |
| 2018/0024653 A1* | 1/2018 | Attarian | G06F 3/0383 345/179 |
| 2019/0042009 A1* | 2/2019 | Kumar | G06F 3/0346 |

* cited by examiner

HAPTIC FEEDBACK FOR COMPUTING SYSTEMS

BACKGROUND

Computing systems allow reception of input via various input devices. The input devices vary based on the capabilities of the computing system. For instance, a touch-enabled computing system may allow reception of input from an electronic pen.

DETAILED DESCRIPTION

Figure 1:
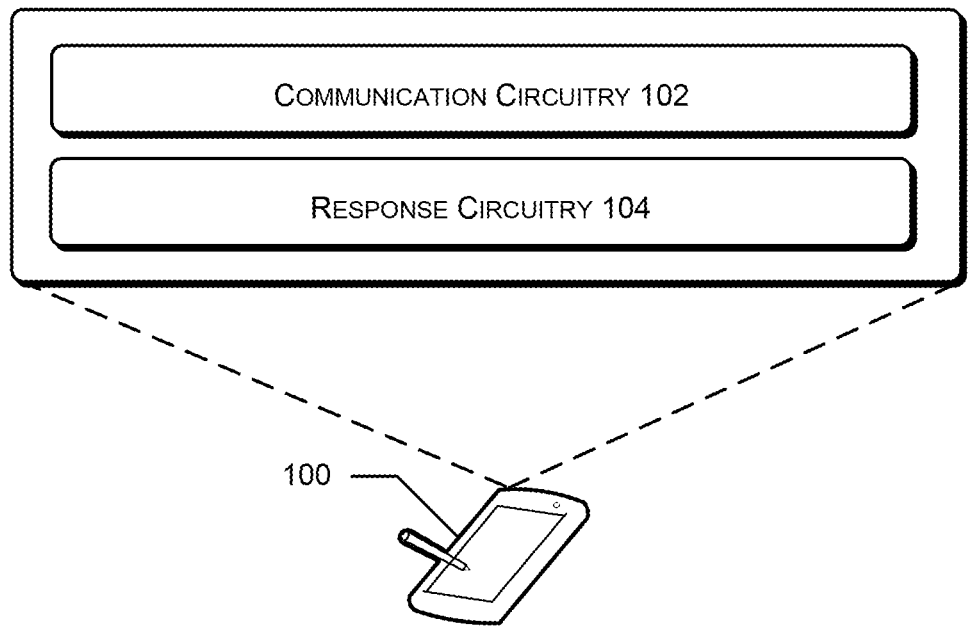
FIG. 1 illustrates a computing system, in accordance with an example implementation of the present subject matter.

In computing systems, providing input via the electronic pen involves an interaction between a display screen of the computing system and an electronic pen. Therefore, reception of input in computing systems using the electronic pen involves interaction between a surface of the display screen and a tip of the electronic pen. Traditionally, the display screens of the computing systems are made of glass, or similar substrates, and the tip of the electronic pen is made of plastic.

As the interaction between the surface of the display screen and the tip of the electronic pen does not correspond to a traditional interaction between writing materials, such as paper and pen, the usage of the electronic pen on the surface of the display screen is sometimes rendered ineffective.

According to example implementations of the present subject matter, techniques for providing haptic feedback in computing systems are described. The haptic feedback in computing systems allows emulation of real-life interaction between the electronic pen and computing systems.

In an example of the present subject matter, an input representing utilisation parameters of the electronic pen is received. The utilisation parameters may include, but not limited to, an intended use of an electronic pen, an amount of force applied by a user on the electronic pen, a location of grip of the user, or a combination thereof. Based on the received utilisation parameters, the computing system may provide haptic feedback to emulate a real-life interaction for the user.

In an example, the computing system may receive an intended use of the electronic pen along with the location of grip. In the example, the computing system may identify and provide a pattern of haptic feedback based on the combination of the intended use and the location of grip of the user.

In another example of the present subject matter, based on the received utilisation parameters, a utilisation mode of an electronic pen may be determined. The utilisation mode may describe an intended use of the electronic pen. For instance, in a utilisation mode, the electronic pen may be intended to be used for writing textual matter. In another utilisation mode, the electronic pen may be intended to be used for sketching and preparation of drawings. Thus, in different utilisation modes, the interaction between the user and a display screen of the computing system is different. Accordingly, there may be multiple utilisation modes that may correspond to various intended uses of the electronic pen. In the example, based on the determination of the utilisation mode of the electronic pen, the computing system may provide a haptic feedback during operation and facilitate the emulation of a real-life interaction for the user. That is, the operation of the electronic pen in such utilisation mode is emulated by providing a pattern of haptic feedback corresponding to the utilisation mode.

The computing system may provide the haptic feedback in various ways. In an example, the computing system may provide the haptic feedback by vibrating the display screen such that user perceives an intended friction between the tip of the electronic pen and the surface of the display screen. In another example, the computing system may provide the haptic feedback by vibrating the electronic pen. Therefore, by providing the haptic feedback based on the utilization parameters and the utilisation mode, the effectiveness and interaction of the electronic pen with the display screen is improved, thereby also improving the user experience. The above techniques are further described with reference to FIG. 1 to FIG. 6. It would be noted that the description and the Figures merely illustrate the principles of the present subject matter along with examples described herein and would not be construed as a limitation to the present subject matter. It is thus understood that various arrangements may be devised that, although not explicitly described or shown herein, embody the principles of the present subject matter. Moreover, all statements herein reciting principles, aspects, and implementations of the present subject matter, as well as specific examples thereof, are intended to encompass equivalents thereof.

FIG. 1 illustrates a computing system 100, in accordance with an example of the present subject matter. Examples of computing system 100 include, but not limited to, laptops, touch-enabled desktops, smartphones, personal digital assistants (PDA), and tablets. The computing system 100 may also be electronically coupled to an electronic pen (not shown). In an example, the computing system 100 may be coupled to the electronic pen via a wired connection. In another example, the computing system 100 may be wirelessly coupled to the computing system via a wireless communication technology that may include, but not limited to, Wi-fi, Bluetooth, and Near Field Communication (NFC).

The computing system 100 includes a communication circuitry 102 that facilitates reception of an input representing utilisation parameters of the electronic pen. The utilisation parameters of the electronic pen may include, but not limited to, an intended use of an electronic pen, an amount of force applied by a user on the electronic pen, a location of grip of the user, or a combination thereof. In an example, the communication circuitry 102 may be implemented as a combination of hardware and programming (for example, programmable instructions) to implement certain functionalities of the circuitry. In examples described herein, such combinations of hardware and programming may be implemented in several different ways. For example, the programming for the circuitry may be processor executable instructions stored on a non-transitory machine-readable storage medium and the hardware for the circuitry may include a processing resource (for example, implemented as either a single processor or a combination of multiple processors), to execute such instructions. In the present examples, the machine-readable storage medium may store instructions that, when executed by the processing resource, implement circuitry. In such examples, the computing system 100 may include the machine-readable storage medium storing the instructions and the processing resource to execute the instructions, or the machine-readable storage medium may be separate but accessible to computing system 100 and the processing resource.

The communication circuitry 102 may allow the reception of the utilisation parameters in various ways. In an example, the communication circuitry 102 may allow the reception of input representing utilisation parameters via a graphical user interface of a computing system 100. For instance, the communication circuitry may allow the user to opt an intended use of the electronic pen from a list of intended uses of the electronic pen through the graphical user interface. In another example, the communication circuitry 102 may allow reception of the input representing utilisation parameters from the electronic pen. For instance, the communication circuitry 102 may facilitate the reception of an amount of force applied by a user on the electronic pen or a location of grip of the user or a combination thereof.

The computing system 100 further includes a response circuitry 104. In an example, the response circuitry 104 may be coupled to the communication circuitry 102. In the example, the response circuitry 104 may be implemented as a combination of hardware and programming (for example, programmable instructions) to implement certain functionalities of the circuitry. In examples described herein, such combinations of hardware and programming may be implemented in several different ways. For example, the programming for the circuitry may be processor executable instructions stored on a non-transitory machine-readable storage medium and the hardware for the circuitry may include a processing resource (for example, implemented as either a single processor or a combination of multiple processors), to execute such instructions. In the present examples, the machine-readable storage medium may store instructions that, when executed by the processing resource, implement circuitry. In such examples, the computing system 100 may include the machine-readable storage medium storing the instructions and the processing resource to execute the instructions, or the machine-readable storage medium may be separate but accessible to computing system 100 and the processing resource.

The response circuitry 104 may provide a pattern of haptic feedback based on the utilisation parameters. The pattern of haptic feedback may be provided in various ways. In an example, the pattern of haptic feedback may be provided by vibrating a display screen (not shown) of the computing system 100. In another example, the pattern of haptic feedback may be provided by vibrating the electronic pen (not shown) of the computing system 100.

In the example, when the haptic feedback is provided by the display screen, the display screen may be vibrated at an ultrasonic frequency. The vibration of the display screen at the ultrasonic frequency avoids noises associated with the vibration of the display screen. As a result, the overall user experience associated with the usage of the electronic pen is improved.

In another example, when the haptic feedback is provided by the electronic pen, the response circuitry 104 may identify the pattern of haptic feedback for the electronic pen and transmit information indicating the pattern of the haptic feedback to the electronic pen via the communication circuitry 102. Based on the pattern of the haptic feedback, the electronic pen may be vibrated at a frequency associated with the pattern of haptic feedback.

In an example, the response circuitry 104 may also identify a utilisation mode based on the utilisation parameters, where the utilisation mode may indicate an intended use of the electronic pen. For instance, based on the location of grip of the user, the response circuitry 104 may identify that the user intends to use the electronic pen for providing textual input. The response circuitry 104 may therefore select a utilisation mode that facilitates providing textual input. Based on the identification of the utilisation mode, the response circuitry 104 may select a pattern of haptic feedback associated with the utilisation mode. Thus, the response circuitry 104 may provide the pattern of haptic feedback by vibrating either the electronic pen or the display screen at a frequency associated with the pattern of haptic feedback.

In another example, the communication circuitry 102 may receive the utilisation mode from the electronic pen. That is, based on the utilisation parameters, the electronic pen may determine the utilisation mode and may provide the utilization mode to the computing system. Based on the received utilisation mode, the response circuitry 104 may identify and provide the pattern of haptic feedback associated with the utilisation mode.

In an illustrative example, a user may indicate to the communication circuitry 102 to use the electronic pen for providing textual input. Based on the indication, the response circuitry 104 may identify a pattern of haptic feedback that corresponds to textual input. In the example, the response circuitry 104 may identify the pattern of haptic feedback that may emulate the usage of a pen on a paper. Based on the identification, the response circuitry 104 may provide the haptic feedback by vibrating either the display screen or the electronic pen, or both at a frequency associated with the pattern of haptic feedback.

In another illustrative example, the communication circuitry 102 may receive from the electronic pen, utilization parameters, such as a location of grip of the user. Based on the location of grip, the response circuitry 104 may identify that the user intends to use the electronic pen for free form input. The response circuitry 104 may thus identify the utilisation mode to be sketching and may identify a pattern of haptic feedback that may facilitate emulation of the usage of a pencil on a canvas. Thus, based on the identification of the utilisation mode, the response circuitry 104 may provide the haptic feedback by vibrating either the display screen or the electronic pen or both at a frequency associated with the sketching.

Figure 2:
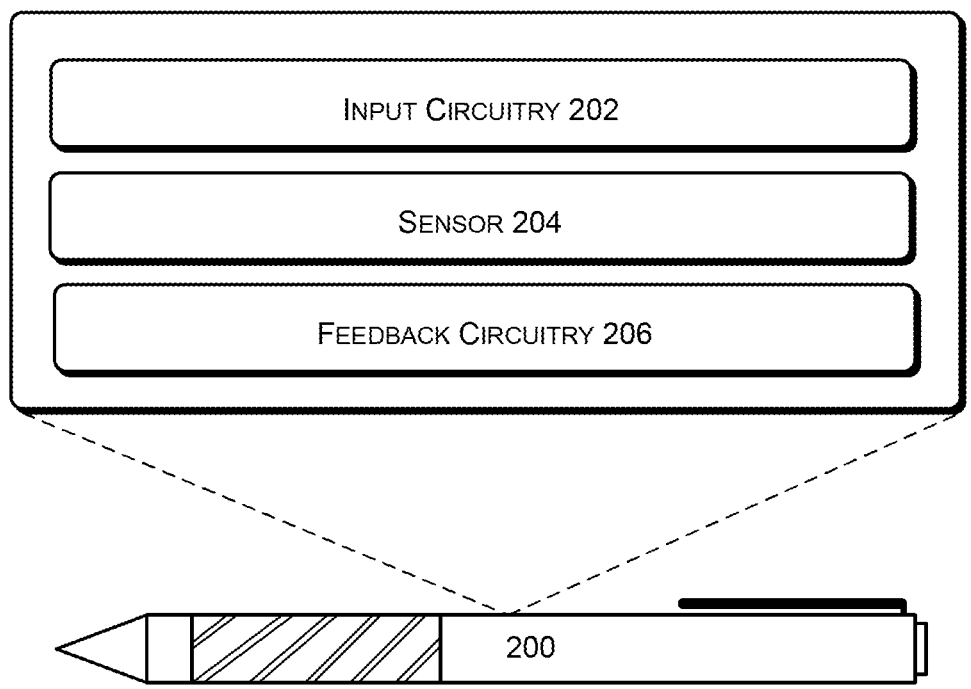
FIG. 2 illustrates an electronic pen, in accordance with an example implementation of the present subject matter.

FIG. 2 illustrates an electronic pen 200, in accordance with an example of the present subject matter. Examples of electronic pen may include, but not limited to, a stylus having the capabilities of an electronic pen and other similar digital pens. Further, the electronic pen 200 may include digital pens capable of providing haptic feedback to the users. The electronic pen 200 may be electronically coupled to a computing system (not shown). In an example, the electronic pen 200 may be coupled to the computing system via a wired connection. In another example, the electronic pen 200 may be wirelessly coupled to the computing system via a wireless communication technology that may include, but not limited to, Wi-fi, Bluetooth, and Near Field Communication (NFC).

In an example, the electronic pen 200 includes an input circuitry 202 that facilitates reception of a user input, where the user input represents an intended use of the electronic pen 200. The input circuitry 202 may allow the reception of the user input in various ways. In an example, the input circuitry 202 may allow the user to opt an intended use of the electronic pen from a list of intended uses of the electronic pen 200 through a graphical user interface of a computing system (not shown). In another example, the input circuitry 202 may allow the user to opt an intended use of the electronic pen via a plurality of physical buttons formed on the electronic pen 200. In the example, the input circuitry 202 may be implemented as a combination of hardware and programming (for example, programmable instructions) to implement certain functionalities of the circuitry, such as receiving a user input representing an intended use of electronic pen 200. In examples described herein, such combinations of hardware and programming may be implemented in several different ways. For example, the programming for the circuitry may be processor executable instructions stored on a non-transitory machine-readable storage medium and the hardware for the circuitry may include a processing resource (for example, implemented as either a single processor or a combination of multiple processors), to execute such instructions. In the present examples, the machine-readable storage medium may store instructions that, when executed by the processing resource, implement circuitry. In such examples, the electronic pen 200 may include the machine-readable storage medium storing the instructions and the processing resource to execute the instructions, or the machine-readable storage medium may be separate but accessible to electronic pen 200 and the processing resource.

In an example, the electronic pen 200 further includes a sensor 204 that senses the usage of the electronic pen 200. Examples of the sensor 204 may include, but not limited to, touch sensor, force sensor, and pressure sensor. The sensor 204 may sense the usage of the electronic pen 200 in a number of ways. In an example, the sensor 204 may sense the usage of the electronic pen 200 based on an amount of force exerted by a user on the electronic pen 200. In another example, the sensor 204 may sense the usage of the electronic pen 200 based on location of grip of the user. The sensor 204 may identify the grip in various ways. In an example, the sensor 204 identifies a location where the user has gripped the electronic pen 200. In another example, the sensor 204 may identify nature of the grip, such as a string grip, a loose grip, or a flexible grip of the user to determine an intended usage of the electronic pen 200.

The electronic pen 200 further includes a feedback circuitry 206 coupled to the sensor 204, to provide haptic feedback to the user. The feedback circuitry 206 may be implemented as a combination of hardware and programming (for example, programmable instructions) to implement certain functionalities of the circuitry. In examples described herein, such combinations of hardware and programming may be implemented in several different ways. For example, the programming for the circuitry may be processor executable instructions stored on a non-transitory machine-readable storage medium and the hardware for the circuitry may include a processing resource (for example, implemented as either a single processor or a combination of multiple processors), to execute such instructions. In the present examples, the machine-readable storage medium may store instructions that, when executed by the processing resource, implement circuitry. In such examples, the electronic pen 200 may include the machine-readable storage medium storing the instructions and the processing resource to execute the instructions, or the machine-readable storage medium may be separate but accessible to electronic pen 200 and the processing resource.

In an example, the input circuitry 202 may receive a user input representing the intended use of the electronic pen 200. Further, the sensor 204 may also sense the usage of the electronic pen 200 based on the grip of the user. Based on the user input and the usage of the electronic pen 200 sensed by the sensor 204, the feedback circuitry 206 may provide a first pattern of haptic feedback to the user. The feedback circuitry 206 may provide the first pattern of haptic feedback to the user in various ways. In an example, the feedback circuitry 206 may provide the first pattern of haptic feedback to the user by vibrating the electronic pen 200 at a frequency associated with the first pattern of haptic feedback. In another example, the feedback circuitry 206 may provide the first pattern of haptic feedback to the user by vibrating the electronic pen 200 at an amplitude associated with the first pattern of haptic feedback.

In an example, the vibration of the electronic pen 200 provides perception of an intended friction between the tip of the electronic pen 200 and the surface of a display screen (not shown). As a result, the effectiveness and interaction of the electronic pen 200 with the display screen is improved, which in turn, improves the user experience associated with the usage of the electronic pen 200. A detailed explanation related to implementation of the above-mentioned techniques is further described with respect to explanation of forthcoming figures.

Figure 3:
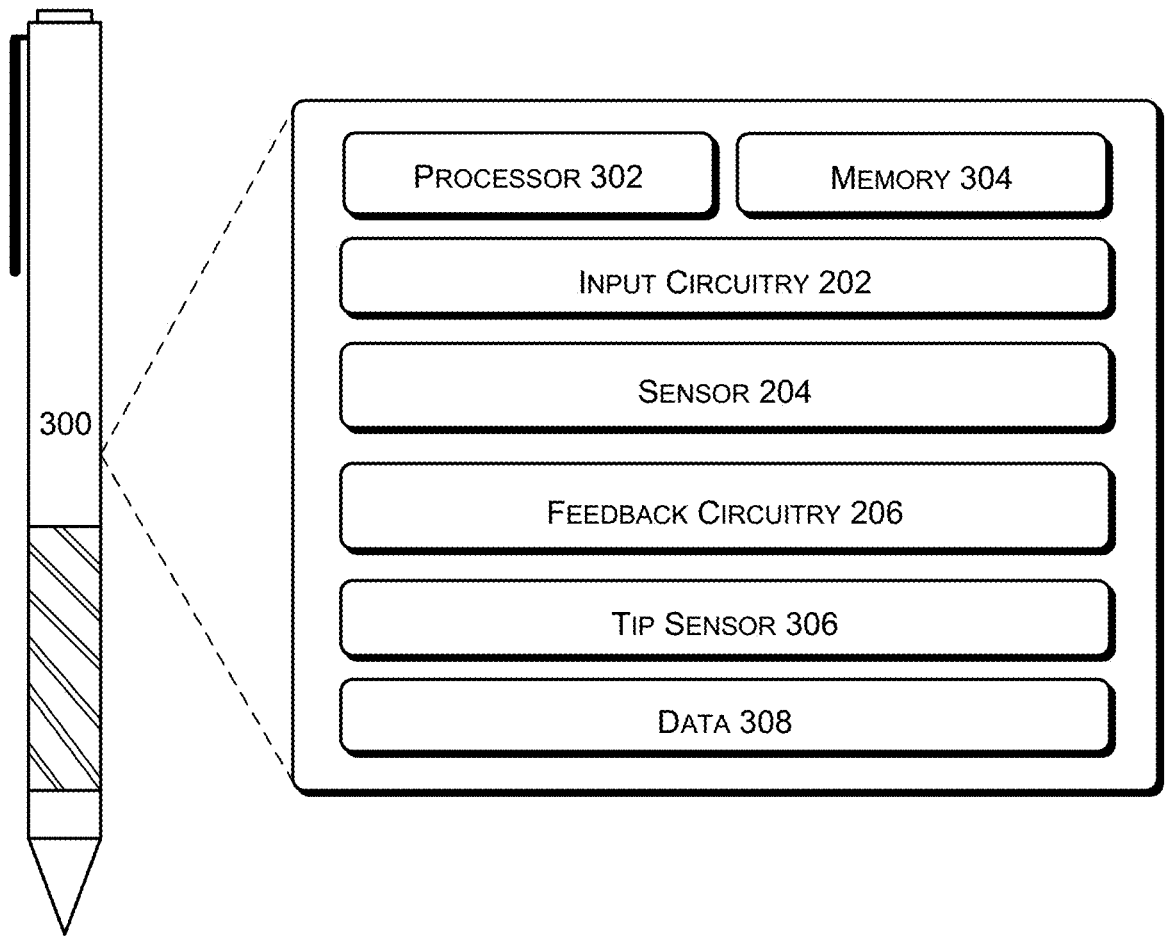
FIG. 3 illustrates an electronic pen, in accordance with another example implementation of the present subject matter.

FIG. 3 illustrates an electronic pen 300, in accordance with another example of the present subject matter. The electronic pen 300 includes a processor 302 and a memory 304 coupled to the processor 302. The functions of the various elements shown in the Figures, including any functional blocks labelled as "processor(s)", may be provided through the use of dedicated hardware as well as hardware capable of executing instructions. When provided by a processor, the functions may be provided by a single dedicated processor, by a single shared processor, or by a plurality of individual processors, some of which may be shared. Moreover, explicit use of the term "processor" would not be construed to refer exclusively to hardware capable of executing instructions, and may implicitly include, without limitation, digital signal processor (DSP) hardware, network processor, application specific integrated circuit (ASIC), field programmable gate array (FPGA), read only memory (ROM) for storing instructions, random access memory (RAM), non-volatile storage. Other hardware, standard and/or custom, may also be included.

Further, the memory 304 may include any computer-readable medium including, for example, volatile memory (e.g., RAM), and/or non-volatile memory (e.g., EPROM, flash memory, etc.).

The electronic pen 300 further includes an input circuitry 202, a sensor 204, and a feedback circuitry 206. As described earlier, the input circuitry 202 may facilitate the reception of a user input representing an intended use of the electronic pen 300.

Further, examples of the sensor 204 may include, but not limited to, touch sensor, force sensor, and pressure sensor. Moreover, the feedback circuitry 206 may include a haptic motor, where examples of haptic motor may include, but not limited to, a piezoelectric motor and a linear resonance actuator (LRA) motor.

The electronic pen 300 may further include data 308, that serves, amongst other things, as a repository for storing data that may be fetched, processed, received, or generated by the input circuitry 202, the sensor 204, and the feedback circuitry 206. In an example, the data 308 may be stored in the memory 304. The data 308 also stores various utilisation modes and the corresponding patterns of haptic feedbacks in a mapped relation.

In an example, the electronic pen 300 may allow the users to create utilisation modes as per their writing preferences and associate various frequencies of vibration with such utilisation modes. Such user defined combinations of utilisation modes and the associated frequencies may also be stored in data 308.

It should be noted that various circuitries that have been described supra, may also be implemented in the computing system 100, electronic pen 200, electronic pen 300, or a combination thereof.

In an example of the present subject matter, a first utilisation mode of the electronic pen 300 may be determined. In an example, the first utilisation mode of the electronic pen 300 may be determined based on a user input. The user input may be received in a number of ways. In an example, the user input may be received via input circuitry 202 of the electronic pen 300. In another example, the user input may be received via an interface of a computing system (not shown) paired to the electronic pen 300. Further, a user may be allowed to select the first utilisation mode from multiple utilisation modes. To facilitate selection of a utilisation mode, the data 308 may store the multiple utilisation modes along with various patterns of haptic feedback associated with multiple utilisation modes.

Thus, based on the determination first utilisation mode, the feedback circuitry 206 may identify a first pattern of haptic feedback corresponding to the first utilisation mode, and activate the electronic pen 300 to provide the first pattern of haptic feedback. In an example, the feedback circuitry 206 may provide the first pattern of haptic feedback by vibrating the electronic pen at a first frequency associated with the first pattern of haptic feedback.

In an illustrative example, the user may intend to use the electronic pen 300 for freeform writing, i.e., drawing or sketching, on the display screen. Accordingly, the user may select a first utilisation mode that may facilitate freeform writing, from the utilisation modes. Based on the selection of the first utilisation mode to be freeform writing, the feedback circuitry 206 may start vibrating the electronic pen 300 at a first frequency associated with the freeform writing. The vibration of the electronic pen 300 at the first frequency may facilitate the user to perceive an amount of friction that is experienced while writing freely on a traditional paper.

In other examples of the present subject matter, the utilisation modes of the electronic pen 300 may be determined based on combination of the user input with the usage of the electronic pen 300.

In an example, the utilisation modes may be determined based on a combination of the user input and an amount of force applied on the electronic pen 300. In another example, the utilisation mode may be determined based on a combination of the user input with a grip of the user. In yet another example, the utilisation mode may be determined based on a combination of the user input, the amount of force applied on the electronic pen, and the grip of the user.

It would be noted that while the determination of the utilisation modes for the electronic pen 300 have been described with respect to the above-mentioned combinations, the determination of the utilisation modes is not limited to the above-mentioned combinations and may be made in accordance with either one of the user input, the amount of force applied on the electronic pen 300, and the grip of the user, or any combination thereof.

In another example of the present subject matter, the electronic pen 300 may provide a pattern of haptic feedback based on a combination of the user input and the usage of the electronic pen 300 determined based on the amount of force being applied on the electronic pen 300. In operation, the input circuitry 202 may receive a user input representing an intended use of the electronic pen 300. Further, the sensor 204 may also simultaneously analyse the amount of force being applied on the electronic pen 300. Based on the combination of the user input and the amount of force applied on the electronic pen 300, the feedback circuitry 206 may determine a utilisation mode of the electronic pen 300. The feedback circuitry 206 may identify the utilisation mode from various utilisation modes stored in data 308. In the example, to facilitate the identification of the utilisation mode based on the combination of user input and the amount of force applied on the electronic pen 300, the data 308 may store combinations of intended uses of the electronic pen 300 and multiple force values associated with the intended uses, in a mapped relation with various utilisation modes. Further, corresponding to each utilisation mode, the data 308 may also store a pattern of haptic feedback.

Based on the determined utilisation mode of the electronic pen, the feedback circuitry 206 may provide a pattern of haptic feedback to the user, where the electronic pen 300 may be vibrated at a frequency associated with the pattern of haptic feedback.

In yet another example of the present subject matter, the electronic pen 300 may be configured to provide a pattern of haptic feedback based on a combination of the user input and the usage of the electronic pen 300 based on the grip of the user. In operation, the input circuitry 202 may receive a user input representing an intended use of the electronic pen 300. The sensor 204 may then analyse the location where the user has gripped the electronic pen 300. Based on the combination of the user input and the grip of the user, the feedback circuitry 206 may determine a utilisation mode of the electronic pen 300. The feedback circuitry 206 may identify the utilisation mode from various utilisation modes stored in data 308.

In the example, to facilitate the identification of the utilisation mode based on the combination of user input and the grip of the user, the data 308 may store combinations of intended uses of the electronic pen 300 and multiple grip positions associated with the intended uses, in a mapped relation with various utilisation modes. Further, corresponding to each utilisation mode, the data 308 may also store a pattern of haptic feedback.

Based on the determined utilisation mode of the electronic pen, the feedback circuitry 206 may provide a pattern of haptic feedback to the user, where the electronic pen 300 may be vibrated at a frequency associated with the pattern of haptic feedback.

In an illustrative example, based on the user input, the input circuitry 202 may determine the intended use of the electronic pen 300 to be drawing. Further, as the electronic pen 300 is gripped by the user after reception of the user input, the sensor 204 may detect a location of grip of the user. In an example, the user may grip the electronic pen 300 at a distal end from a tip (not shown) of the electronic pen. Based on the grip of the user, the feedback circuitry 206 may access the mapped relation stored in data 308 and may identify a utilisation mode corresponding to intended use as drawing and the grip at the distal end from the tip of the electronic pen 300. In the example, the utilisation mode may be identified as 'sketching'. Based on the identification of the utilisation mode to be 'sketching', the feedback circuitry 206 may access the data 308 and provide a pattern of haptic feedback corresponding to sketching.

In another example of the present subject matter, the electronic pen 300 may be configured to provide a pattern of haptic feedback based on a combination of the user input and the usage of the electronic pen 300 based on the grip of the user and the amount of force applied by the user on the electronic pen 300.

In operation, the input circuitry 202 may receive a user input representing an intended use of the electronic pen 300. The sensor 204 may then analyse the location where the user has gripped the electronic pen 300. The sensor 204 may also analyse the amount of force applied by the user on the electronic pen 300. Based on the combination of the user input, the grip of the user, and the amount of force applied on the electronic pen 300, the feedback circuitry 206 may determine a utilisation mode of the electronic pen 300. In an example, the feedback circuitry 206 may identify the utilisation mode from various utilisation modes stored in data 308.

In the example, to facilitate the identification of the utilisation mode based on the combination of user input, the grip of the user, and the force applied on the electronic pen 300, the data 308 may store combinations of intended uses of the electronic pen 300, multiple grip positions associated with the intended uses, and various amount of forces applied on the electronic pen 300 in a mapped relation with various utilisation modes. Further, corresponding to each utilisation mode, the data 308 may also store a pattern of haptic feedback.

Based on the determined utilisation mode of the electronic pen, the feedback circuitry 206 may provide a pattern of haptic feedback to the user, where the electronic pen 300 may be vibrated at a frequency associated with the pattern of haptic feedback.

In an example of the present subject matter, the feedback circuitry 206 may also provide haptic feedback based on either force applied on the electronic pen 300 or the grip of the user. That is, without requesting a user input, the feedback circuitry 206, depending on the usage of the electronic pen 300, may determine a utilization mode of the electronic pen 300.

In an example, the sensor 204 may sense the usage of the electronic pen 300 based on an amount of force applied by the user on the electronic pen 300. Based on the amount of force sensed by the sensor 204, the feedback circuitry 206 may identify a utilisation mode. On identification of the utilisation mode, the feedback circuitry 206 may configure the electronic pen to provide a pattern of haptic feedback corresponding to the utilisation mode. In an example, the feedback circuitry 206 may provide the pattern of haptic feedback by vibrating the electronic pen 300 at a frequency associated with the second pattern of haptic feedback.

In a similar example, the sensor 204 may determine the usage of the electronic pen 300 based on the grip of the user. Based on the grip sensed by the sensor 204, the feedback circuitry 206 may identify a utilisation mode. On identification of the utilisation mode, the feedback circuitry 206 may configure the electronic pen to provide a pattern of haptic feedback corresponding to the utilisation mode.

Further, in an example, the sensor 204 may sense the usage of the electronic pen 300 when the electronic pen is already operating in a first utilisation mode determined based on the user input. Based on the amount of force being applied on the electronic pen 300, the feedback circuitry 206 may configure the electronic pen to switch from the first utilisation mode to the second utilisation mode. Accordingly, the feedback circuitry 206 may configure the electronic pen 300 to switch from the first pattern of haptic feedback to the second pattern of haptic feedback. That is, the feedback circuitry 206 may change the frequency of vibration of the electronic pen 300 from the first frequency to the second frequency.

In an illustrative example, the electronic pen 300 may be operating in the first utilisation mode that was selected based on the user input. In an example, the first utilisation mode may be freeform writing. While the electronic pen 300 is operating in the first utilisation mode and providing the first pattern of haptic feedback associated with the first utilisation mode, the sensor 204 may sense the amount of force being applied on the electronic pen. Based on the amount of force applied on the electronic pen 300, the feedback circuitry 206 identify a second utilisation mode to be sketching. Based on the identification of the second utilisation mode to be sketching, the feedback circuitry 206 may configure the electronic pen 300 to provide a second pattern of haptic feedback associated with sketching. That is, the feedback circuitry 206 may vibrate the electronic pen at the second frequency associated with sketching.

Thus, based on the amount of force applied by the user on the electronic pen 300, the feedback circuitry 206 may change the frequency of vibration of the electronic pen from the first frequency that is associated with drawing to a second frequency that is associated with a specific usage of the electronic pen 300. As a result, the feedback circuitry 206 may allow the electronic pen 300 to provide accurate patterns of haptic feedback corresponding to multiple utilisation modes.

In an example, the feedback circuitry 104 may change the utilisation mode of the electronic pen from the first utilisation mode to the second utilisation mode when the second utilisation mode is a sub-utilisation mode of the electronic pen. That is, the feedback circuitry 206 may allow to change the utilisation mode of the electronic pen from the first utilisation mode to the second utilisation mode when the first utilisation mode is related to the second utilisation mode. For instance, as described above, the feedback circuitry 206 may allow the utilisation mode of the electronic pen 300 to be changed from freestyle to sketching.

In an example implementation of the present subject matter, the electronic pen 300 may further comprise a tip sensor 306. Examples of tip sensor 306 may include, but not limited to, touch sensor, force sensor, proximity sensor, and pressure sensor. In an example, the tip sensor 306 may detect a presence of an interaction between the electronic pen 300 the display screen of the computing system. In the example, the feedback circuitry 206 may provide the haptic feedback based on detection of the interaction between the electronic pen 300 the display screen of the computing system. That is, if the tip sensor 306 detects the presence of interaction between the electronic pen 300 and the display screen, the feedback circuitry 206 may activate the electronic pen 300 to provide a pattern of haptic feedback to the user based on a selected utilisation mode. On the other hand, if the presence of interaction between the electronic pen 300 and the display screen is not detected, the feedback circuitry 206 may not provide any haptic feedback and keep the electronic pen in a low-power mode.

Figure 4:
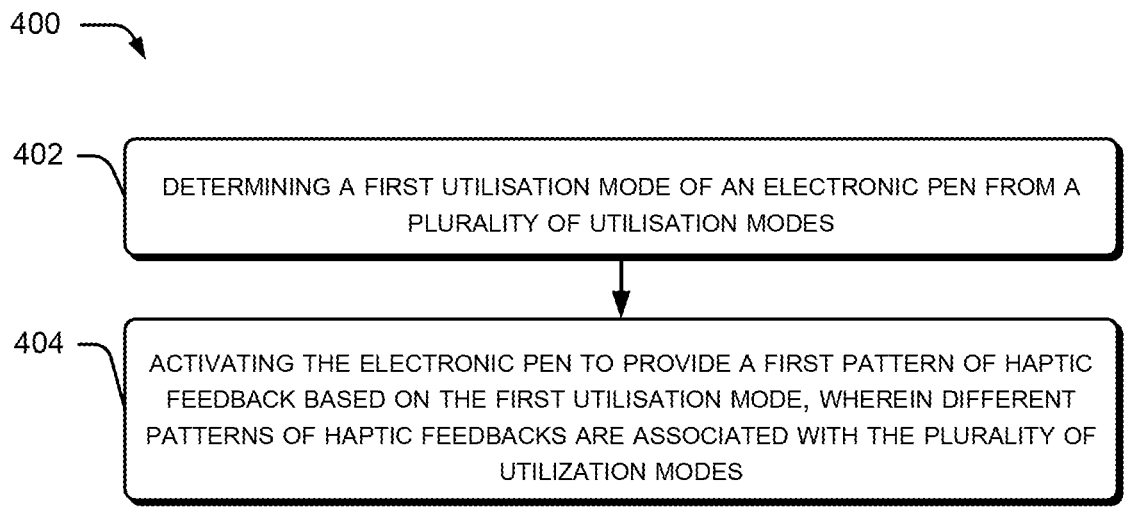
FIG. 4 illustrates a method for providing haptic feedback in an electronic pen, in accordance with an example implementation of the present subject matter.
Figure 5:
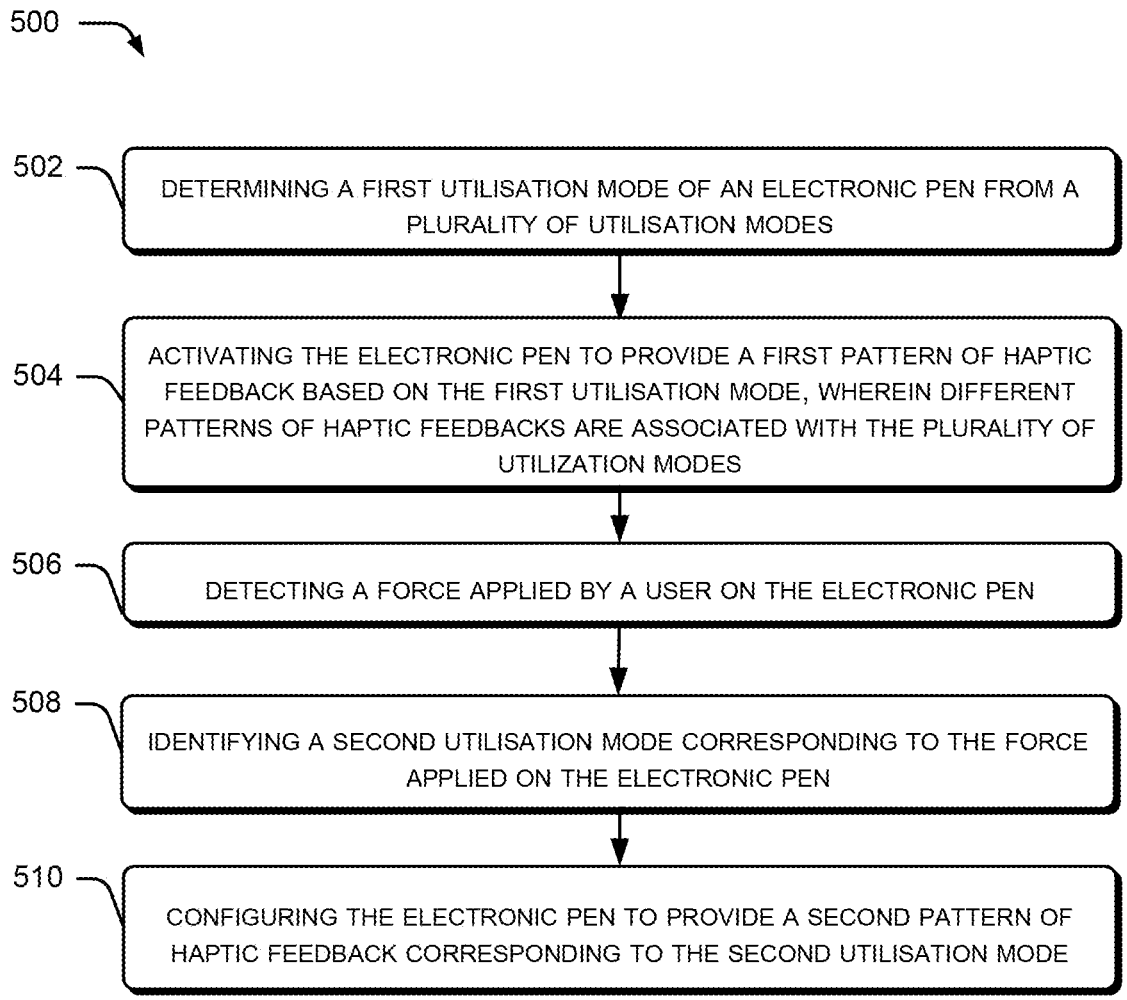
FIG. 5 illustrates a method for providing haptic feedback in an electronic pen, in accordance with another example implementation of the present subject matter.

FIG. 4 and FIG. 5 illustrate methods 400 and 500 for providing haptic feedback in an electronic pen, in accordance with examples of the present subject matter. Although the method 400 and 500 may be implemented in a variety of electronic pens, but for the ease of explanation, the description of the methods 400 and 500 is provided in reference to the above-described electronic pen 300. The order in which the methods 400 and 500 are described is not intended to be construed as a limitation, and any number of the described method blocks may be combined in any order to implement the method 400 and 500, or an alternative method.

It may be understood that blocks of the methods 400 and 500 may be performed in the electronic pen 300. The blocks of the methods 400 and 500 may be executed based on instructions stored in a non-transitory computer-readable medium, as will be readily understood. The non-transitory computer-readable medium may include, for example, digital memories, magnetic storage media, such as magnetic disks and magnetic tapes, hard drives, or optically readable digital data storage media.

At block 402, a first utilisation mode of the electronic pen is determined. In an example, the first utilisation mode may be determined from multiple utilisation modes. Further, the first utilisation mode may be determined based on a user input. In the example, an input circuitry 202 of the electronic pen 300 may allow the reception of the user input representing the first utilisation mode.

At block 404, the electronic pen 300 is activated to provide a first pattern of haptic feedback based on the first utilisation mode. In an example, a feedback circuitry 206 of the electronic pen 300 may provide the first pattern of haptic feedback. In the example, a data 308 of the electronic pen 300 may store multiple utilisation modes mapped with various patterns of haptic feedback. Further, the various patterns of haptic feedback stored in the data 308 may represent frequencies at which the electronic pen 300 may be vibrated to provide various patterns of haptic feedback to users. Thus, to provide the haptic feedback, the feedback circuitry 206 may access the data 308 to access a first pattern of the haptic feedback corresponding to the first utilisation mode and vibrate the electronic pen 300 at a first frequency associated with the first utilisation mode.

FIG. 5 illustrates a method 500 for providing haptic feedback in an electronic pen, in accordance with an example of the present subject matter.

At block 502, a first utilisation mode of the electronic pen 300 is determined from multiple utilisation modes. In an example, the first utilisation mode is selected in response to a user input received by an input circuitry 202 of the electronic pen 300.

At block 504, the electronic pen 300 is activated to provide a first pattern of haptic feedback based on the first utilisation mode. In an example, a feedback circuitry 206 may activate the electronic pen 300 to provide the first pattern of haptic feedback. Further, in the example, the electronic pen 300 may be activated from a sleep mode to provide the first pattern of haptic feedback.

At block 506, an amount of force being applied to the electronic pen 300 may be determined. In an example, a sensor 204 of the electronic pen may determine the amount of force being applied on the electronic pen 300.

At block 508, based on the amount of force being applied on the electronic pen 300, a second utilisation mode of the electronic pen 300 may be identified. In an example, the feedback circuitry 206 may determine the second utilisation mode of the electronic pen 300. Similar to the first utilisation mode, the second utilisation mode of the electronic pen 300 may also be identified from the multiple modes.

At block 510, the electronic pen 300 is configured to provide a second pattern of haptic feedback, where the second pattern of haptic feedback is associated with the second utilisation mode. In an example, the feedback circuitry 206 may configure the electronic pen 300 to provide the second pattern of haptic feedback. Further, the electronic pen 300 may be configured to provide the second pattern of haptic feedback in a number of ways. In an example, the electronic pen 300 may be in the sleep mode when the sensor 204 determines the amount of force applied on the electronic pen 300. In response to the determination of the amount of force by the sensor 204, the feedback circuitry 206 may activate the electronic pen 300 from the sleep mode to provide the second pattern of haptic feedback corresponding to the second utilisation mode. In another example, the electronic pen 300 may be operating in the first utilisation mode when the sensor 204 determines the application of a force on the electronic pen 300. In response to the determination of the force by the sensor 204, the feedback circuitry 206 may configure the electronic pen 300 to switch to the second utilisation mode and provide the second pattern of haptic feedback corresponding to the second utilisation mode.

Figure 6:
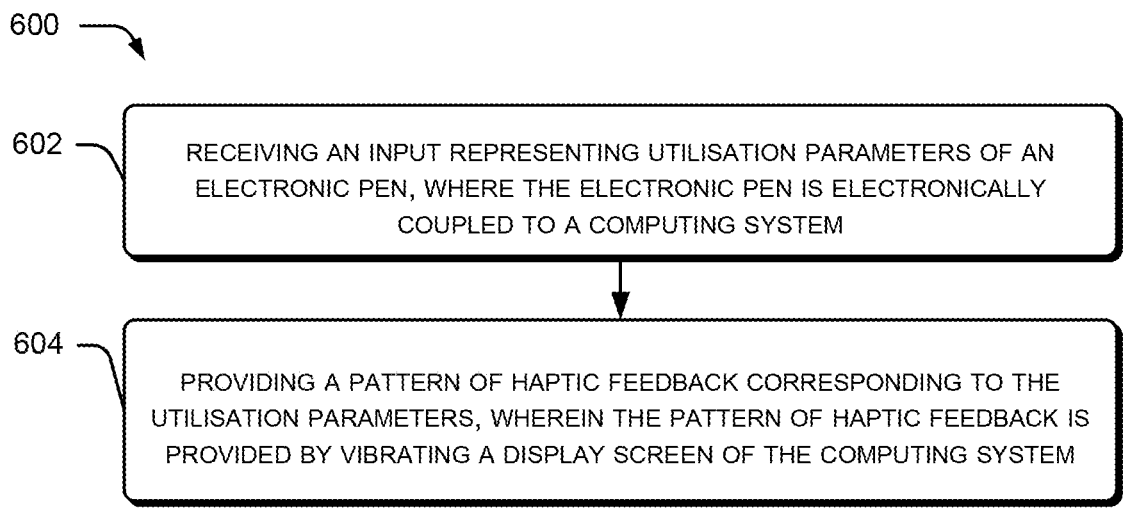
FIG. 6 illustrates a method for providing haptic feedback in a computing system, in accordance with an example implementation of the present subject matter.

FIG. 6 illustrates a method 600 for providing haptic feedback in a computing system, in accordance with examples of the present subject matter. Although the method 600 may be implemented in a variety of computing systems, but for the ease of explanation, the description of the method 600 is provided in reference to the above-described computing system 100. The order in which the method 600 is described is not intended to be construed as a limitation, and any number of the described method blocks may be combined in any order to implement the method 600, or an alternative method.

It may be understood that blocks of the method 600 may be performed in the computing system 100. The blocks of the method 600 may be executed based on instructions stored in a non-transitory computer-readable medium, as will be readily understood. The non-transitory computer-readable medium may include, for example, digital memories, magnetic storage media, such as magnetic disks and magnetic tapes, hard drives, or optically readable digital data storage media.

At block 602, an input representing utilisation parameters of an electronic pen is received. In an example, the electronic pen may be electronically coupled to a computing system. Further, the input may be received via a communication circuitry 102 of the computing system 100. Moreover, the input may be received via various interfaces. In an example, the input may be received via a graphical user interface of the computing system 100. In another example, the input may be received by from the electronic pen. In the example, the communication circuitry 102 may receive the input based on the usage of the electronic pen. For instance, the communication circuitry 102 may identify either an amount of force being applied on the electronic pen or a location of grip of the user while receiving input from the electronic pen.

At block 604, a pattern of haptic feedback corresponding to the utilisation parameters may be provided. In an example, the pattern of haptic feedback may be provided by a response circuitry 104 of the computing system 100. The response circuitry 104 may provide the pattern of haptic feedback by vibrating a display device of the computing system 100. In an example, the response circuitry 104 may vibrate the display device at a frequency associated with the received utilisation parameters. Specifically, based on the received utilisation parameters, the response circuitry 104 may identify a utilisation mode of the electronic pen. In the example, the computing system 100 may store various utilisation modes of the electronic pen and frequencies in a mapped relation. Based on the identified utilisation mode, the response circuitry 104 may identify a frequency corresponding to the utilisation mode and vibrate the display screen at the frequency to provide the pattern of haptic feedback.

Although examples of the present subject matter have been described in language specific to methods and/or structural features, it is to be understood that the present subject matter is not limited to the specific methods or features described. Rather, the methods and specific features are disclosed and explained as examples of the present subject matter.

We claim:

1. A computing system comprising:
   a communication circuitry to receive an input representing utilization parameters of an electronic pen, wherein the electronic pen is electronically coupled to the computing system; and
   a response circuitry coupled to the communication circuitry to provide a pattern of haptic feedback corresponding to the utilization parameters,
   wherein the utilization parameters include an amount of force applied by a user on the electronic pen and a location of grip of the user,
   wherein different patterns of haptic feedbacks are associated with different utilization parameters and include vibrations at different frequencies.

2. The computing system as claimed in claim 1, wherein the utilization parameters further include a user input representing an intended use of the electronic pen.

3. The computing system as claimed in claim 2, wherein the response circuitry determines a utilization mode of the electronic pen based on the utilization parameters, and wherein the pattern of haptic feedback is based on the determined utilization mode.

4. The computing system as claimed in claim 1, wherein the pattern of haptic feedback is provided by the electronic pen.

5. The computing system as claimed in claim 4, wherein the communication circuitry is to transmit information indicating the pattern of haptic feedback to the electronic pen.

6. The computing system as claimed in claim 1, wherein the pattern of haptic feedback is provided by a display screen of the computing system.

7. A method comprising:
   determining utilization parameters including an amount of force applied by a user on an electronic pen and a location of grip of the user;
   determining a first utilization mode of the electronic pen from a plurality of utilization modes based on the utilization parameters; and
   activating the electronic pen to generate a first pattern of haptic feedback based on the first utilization mode, wherein different patterns of haptic feedbacks are associated with the plurality of utilization modes and include vibrations at different frequencies.

8. The method as claimed in claim 7, wherein providing the first pattern of haptic feedback corresponding to the first utilization mode comprises vibrating the electronic pen at a first frequency associated with the first pattern of haptic feedback.

9. The method as claimed in claim 7, wherein providing the first pattern of haptic feedback corresponding to the first utilization mode comprises vibrating the electronic pen at a first amplitude associated with the first pattern of haptic feedback.

10. The method as claimed in claim 7, further comprising:
    identifying a second utilization mode corresponding to the amount of force applied on the electronic pen; and
    configuring the electronic pen to provide a second pattern of haptic feedback corresponding to the second utilization mode.

11. The method as claimed in claim 7, wherein the determining comprises receiving an input from a user defining the first utilization mode for the electronic pen.

12. The method as claimed in claim 7, wherein activating the electronic pen to generate the first pattern of haptic feedback based on the first utilization mode includes accessing stored utilization modes and corresponding patterns of haptic feedbacks in a mapped relation to determine the first pattern of haptic feedback based on the first utilization mode.

13. An electronic pen comprising:
    an input circuitry to receive a user input, wherein the user input represents an intended use of the electronic pen;
    a sensor coupled to the input circuitry to sense an intended usage of the electronic pen based on grip of a user; and
    a feedback circuitry coupled to the sensor to provide a first pattern of haptic feedback based on a first user input and a first intended usage of the electronic pen, and a second pattern of haptic feedback on a second user input and a second intended usage of the electronic pen,
    wherein the first pattern of haptic feedback and the second pattern of haptic feedback include vibrations at different frequencies.

14. The electronic pen as claimed in claim 13, wherein the sensor includes a force sensor, a pressure sensor, a touch sensor, or a combination thereof.

15. The electronic pen as claimed in claim 13, wherein the electronic pen further comprises a tip sensor to detect a presence of an interaction between the electronic pen and a display screen.

16. The electronic pen as claimed in claim 15, wherein the feedback circuitry provides the first pattern of haptic feedback based on the presence of the interaction between the electronic pen and the display screen.

17. The electronic pen as claimed in claim 13, wherein the feedback circuitry includes a piezoelectric motor or linear resonance actuator (LRA) motor.

* * * * *